United States Patent [19]

Bäumers et al.

[11] Patent Number: 4,510,815

[45] Date of Patent: Apr. 16, 1985

[54] FLYWEIGHT VIBRATOR DESIGNED AS DIRECTIONAL VIBRATOR

[75] Inventors: Johannes Bäumers; Werner Lisken, both of Düsseldorf; Heinz Lietzke, Neuss, all of Fed. Rep. of Germany

[73] Assignee: Losenhausen Maschinenbau AG, Düsseldorf, Fed. Rep. of Germany

[21] Appl. No.: 394,717

[22] Filed: Jul. 2, 1982

[30] Foreign Application Priority Data

Jul. 18, 1981 [EP] European Pat. Off. ........ 81710026.6

[51] Int. Cl.³ ........................ F16H 33/00; F16H 33/20

[52] U.S. Cl. ........................................ 74/61; 366/128; 209/367; 404/117; 198/770; 173/49

[58] Field of Search ............................ 74/61; 366/128; 209/367, 366.5; 404/117; 198/770; 173/49

[56] References Cited

U.S. PATENT DOCUMENTS

| | | | |
|---|---|---|---|
| 1,145,445 | 7/1915 | Stewart | 74/61 |
| 2,144,382 | 1/1939 | Lincoln et al. | 209/367 X |
| 2,445,175 | 7/1948 | Hittson | 74/61 |
| 2,512,304 | 6/1950 | Calver | 74/61 |
| 2,677,995 | 5/1954 | Wood | 404/117 |
| 3,056,306 | 10/1962 | Müller | 74/61 |
| 3,280,924 | 10/1966 | Pavlovich | 173/49 X |
| 3,433,311 | 3/1969 | Lebelle | 173/49 |
| 3,465,599 | 9/1969 | Hennecke et al. | 74/61 |
| 4,033,193 | 7/1977 | Brander | 74/61 |

FOREIGN PATENT DOCUMENTS

| | | | |
|---|---|---|---|
| 708737 | 5/1965 | Canada | 173/49 |
| 84706 | 6/1980 | Japan | 198/770 |
| 620284 | 7/1978 | U.S.S.R. | 74/61 |

*Primary Examiner*—Rodney H. Bonck
*Assistant Examiner*—David D. House
*Attorney, Agent, or Firm*—Lee, Smith & Zickert

[57] ABSTRACT

Two flyweight shafts 12,22 are coupled by means of gears 18,30 each attached to one flyweight shaft 12,22 and two intermediate gears 54,56 each engaging one of these gears 18,30 and mesh with each other. Each of the intermediate gears 54, 56 is mounted on one of the oscillating cranks 32, 34 pivotably mounted on the associated flyweight shaft 12 and 22, respectively. The oscillating cranks 32 and 34 are held parallel to each other and can be pivoted to effect a relative phase displacement of the flyweight shafts 12, 22. The oscillating cranks 32,34 are provided with counterweights 62,64 and are thereby mass balanced to prevent oscillations from becoming effective on the oscillating cranks 32,34 and thus on the adjusting mechanism 60 during vibratory operation due to intertial forces.

4 Claims, 3 Drawing Figures

FLYWEIGHT VIBRATOR DESIGNED AS DIRECTIONAL VIBRATOR

The invention relates to a flyweight vibrator designed as a directional vibrator with the direction of oscillation being adjustable, comprising (a) a housing
(b) a first flyweight shaft, which
  ($b_1$) is mounted in the housing,
  ($b_2$) carries a first flyweight,
  ($b_3$) is connected with a first gear and
  ($b_4$) is adapted to be driven by a motor,
(c) a second flyweight shaft, which
  ($c_1$) is mounted in the housing, parallel to the first flyweight shaft,
  ($c_2$) carries a second flyweight and
  ($c_3$) is connected to a second gear,
(d) a first oscillating crank pivotably mounted about the axis of the first flyweight shaft,
(e) a second oscillating crank pivotably mounted about the axis of the second flyweight shaft,
(f) a connecting rod,
  ($f_1$) which is coupled to the first and the second oscillating crank at equal distances from the axes of the associated flyweight shafts and
  ($f_2$) the effective length of which is equal to the distance of these axes from each other.
(g) a first intermediate gear, which
  ($g_1$) is mounted for rotation on the first oscillating crank at a distance from the first flyweight shaft and
  ($g_2$) meshes with the first gear,
(h) a second intermediate gear, which
  ($h_1$) is mounted for rotation on the second oscillating crank at a distance from the axis of the second flyweight shaft equal to the distance of the first intermediate gear from the axis of the first flyweight shaft,
  ($h_2$) meshes with the second gear and
  ($h_3$) meshes with the first intermediate gear and
(i) a shifting mechanism arranged to rotate the two oscillating cranks.

Such flyweight vibrators designed as directional vibrators are utilized particularly with self-propelled vibratory plates, in which the direction of movement of the vibratory plate is variable by variation of the direction of oscillation. In such flyweight vibrators, two flyweights having two parallel flyweight shafts mounted in a common housing rotate in opposite directions. Each of the flyweights generates a centrifugal force rotating at drive speed. Due to the rotation in opposite directions of the two centrifugal forces, the centrifugal force components counterbalance in one plane, whereas they add in the plane perpendicular thereto. In this way, a resultant oscillation in one plane is generated. The position of this oscillation plane depends on the mutual phase relation of the rotating flyweights and may be varied by varying this phase relation. This variation of the mutual phase relation of the centrifugal weights has to take place during operation of the flyweight vibrator and preferably should be effected continuously.

A prior art arrangement permitting a continuous adjustment of the flyweights during operation consists in that the flyweight shafts are each provided with a gear. The two gears engage intermediate gears, the intermediate gears in turn meshing with each other. The intermediate gears are mounted on oscillating cranks which are pivotable about the axes of the flyweight shafts and interconnected by a connecting rod such that they together with this connecting rod form a parallel link arrangement. One of the flyweight shafts is driven. By pivoting the parallel link arrrangement with the two oscillation cranks, the relative position of the other flyweight shaft with respect to the driven flyweight shaft is varied and thus the position of the resultant oscillation plane.

In the prior art flyweight vibrators of this type, problems arise if the resulting oscillation plane does not extend in parallel to the longitudinal direction of the oscillating cranks, thus in parallel to the planes extending through the axes of the flyweight shafts and the axes of the intermediate gears. Then inertial forces act upon intermediate gears because of the oscillations, which inertial forces try to periodically reciprocate the oscillation cranks. These inertial forces act also on the shifting mechanism and have to be absorbed by it. The prior art flyweight vibrators therfore contained expensive shifting mechanisms, e.g. in the form of a worm drive.

It is the object of the invention to relieve the shifting mechanism from such oscillations in a flyweight vibrator of the type defined in the beginning.

According to the invention, this object is achieved in that (j) each of the oscillating cranks has a counterweight on the side opposite the intermediate gear with respect to the axis of the flyweight shaft.

In this way, each of the oscillating cranks may be individually mass-balanced such that the resulting oscillations of the flyweight vibrator, even if they do not fall into the longitudinal direction of the oscillating cranks, do not exert any torque upon the oscillating cranks about the axis of the flyweight shaft.

Modifications of the invention are subject matter of the subclaims.

An embodiment of the invention will now be described in greater detail with reference to the accompanying drawings.

Figure 1:
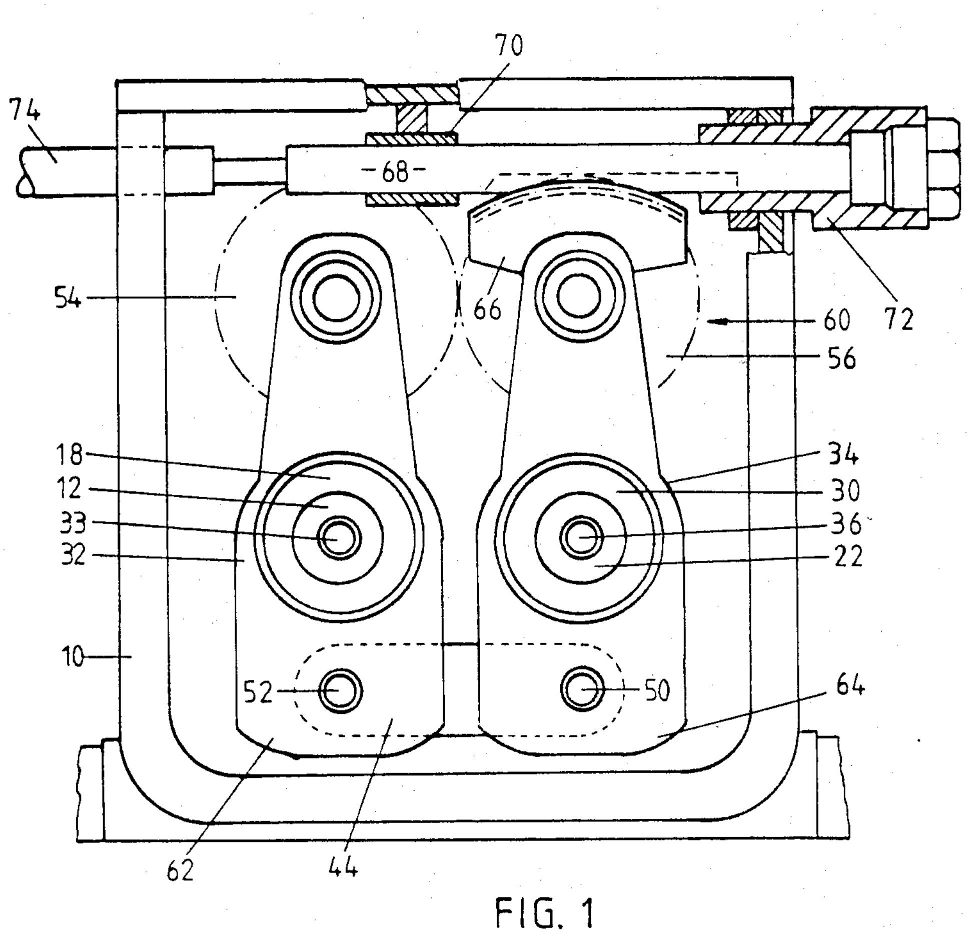
FIG. 1 is a side elevational, partially sectional view of a flyweight vibrator designed as a directional vibrator.

The flyweight vibrator comprises a housing 10. A first flyweight shaft 12 is mounted in bearings 14 in the housing 10. The first flyweight shaft 12 carries a first flyweight 16. It is connected to a first gear 18. A pulley 20 is attached to the first flyweight shaft 12, through which pulley the first flyweight shaft 12 is driven by a motor (not shown). A second flyweight shaft 22 is mounted in the housing 10, parallel to the first flyweight shaft 12 in bearings 24 and 26. It carries a second flyweight 28 here formed by two partial weights 28A and 28B symmetrically disposed on both sides of the flyweight 16. A second gear 30 is connected to the second flyweight shaft 22. The two gears 18 and 30 do not mesh with each other.

A first oscillating crank 32 is mounted to pivot about the axis 33 of the first flyweight shaft 12. A second oscillating crank 34 is mounted to pivot about the axis 36 of the second flyweight shaft 22. As can be best seen from FIG. 2, the oscillating crank 34 consists of two halves 34A and 34B mounted by ball bearings 38 and 40 on both sides of the gear 30 on the second shaft 22 and interconnected at a distance from the second shaft 22 by means of a pin 42. In a similar manner, the oscillating crank 32 is mounted on the first shaft 12. A connecting rod 44 is coupled to the first and the second oscillating cranks 32 and 34, respectively. A bolt 46 extends between the two parts 34A and 34B of the oscillating crank 34. The connecting rod 44 is mounted on this bolt 46 between these parts 34A and 34B in one end by means of a needle bearing 48. In the same way, the connecting rod 44 is mounted on the oscillating crank 32. The distance between the axis 50, about which the connecting rod 44 is pivotably coupled to the oscillating crank 34, and the axis 36 of the second shaft is equal to the distance between the axis 52, about which the connecting rod 44 is pivotably coupled to the first oscillating crank 32 and the axis 33 of the first flyweight shaft 12. The effective length of the connecting rod 44, i.e. the distance between the axes 50 and 52, is equal to the distances between the axes 33 and 36 of the flyweight shafts 12 and 22, respectively. This ensures that the axes 33,36,50 and 52 always form the corners of a parallelogram and that the oscillating cranks 32 and 34 always extend in parallel to each other.

A first intermediate gear 54 is mounted for rotation on the first oscillating crank 32 at a distance from the axis 33 of the first flyweight shaft 12. The first intermediate gear 54 meshes with the first gear 18. A second intermediate gear 56 is mounted for rotation on the second oscillating crank 34 at a distance from the axis 36 of the second flyweight shaft 22 equal to the distance between the first intermediate gear 54 and the axis 33 of the first flyweight shaft 12. As can be seen from FIG. 2, the second intermediate gear 56 is mounted for rotation on the pin 42 by means of a needle bearing 58. In the same way, the first intermediate gear 54 is mounted on the oscillating crank 32. The second intermediate gear 56 meshes with the second gear 30. As can be seen from FIG. 1, it furthermore meshes with the first intermediate gear 54. Thereby, the second flyweight shaft 22 is driven by the first flyweight shaft 12 through the gear 18, the first intermediate gear 54, the second intermediate gear 56 and the second gear 30, and this in opposite direction to flyweight shaft 12.

The two oscillating cranks 32 and 34 are arranged to be rotated by a shifting mechanism 60 still to be described.

Figure 2:
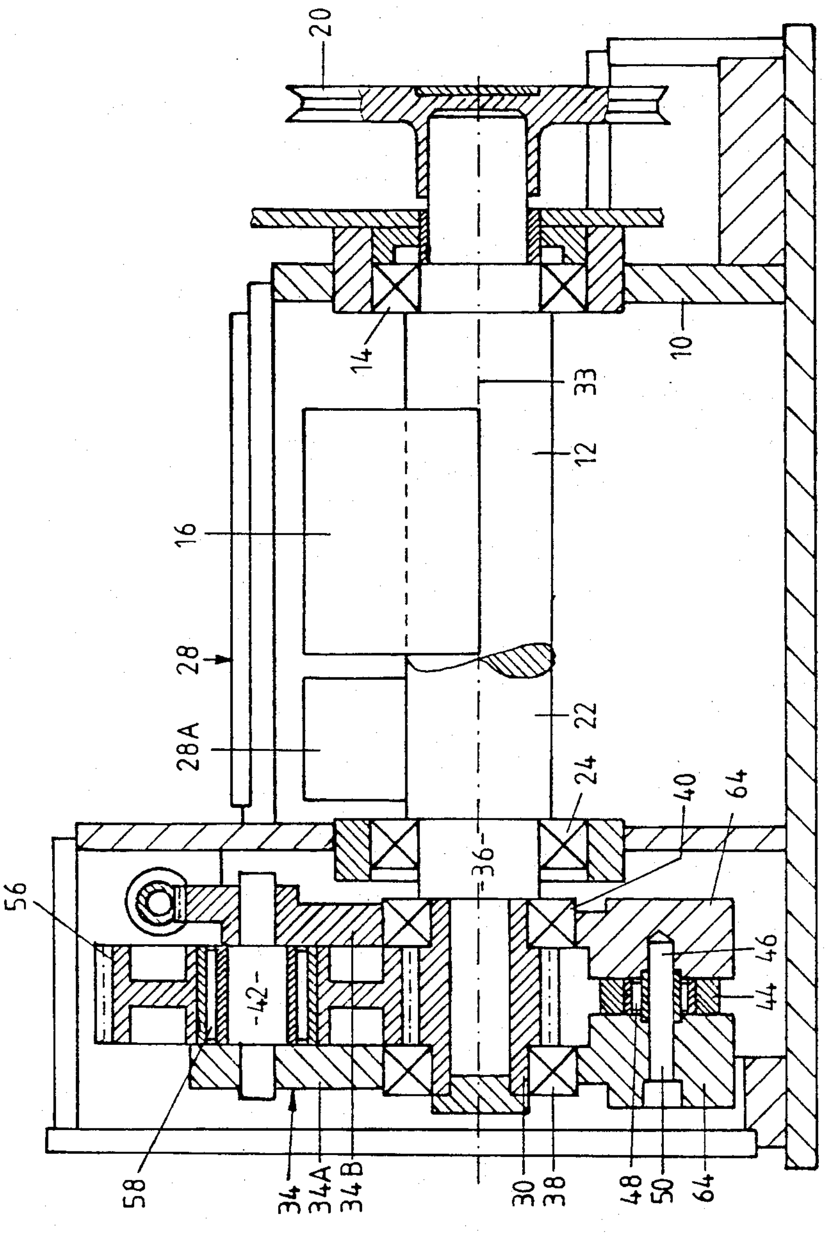
FIG. 2 is an end view of the flyweight vibrator, also partially in section.
Figure 3:
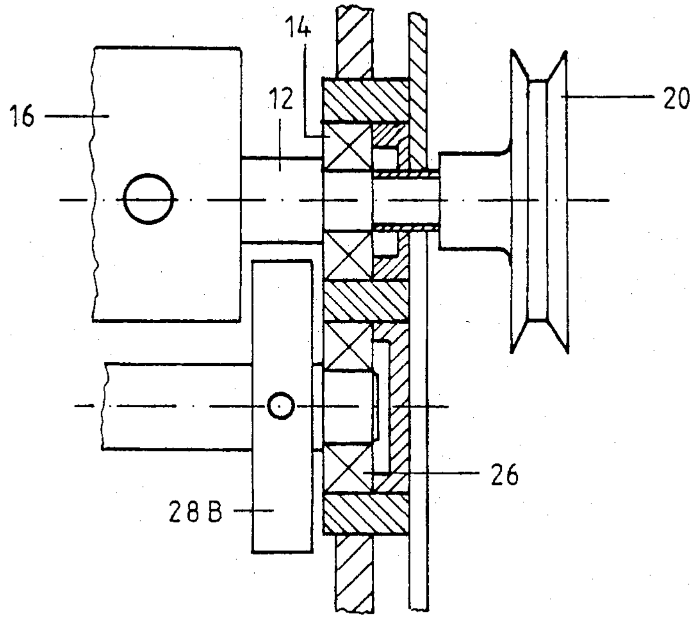
FIG. 3 is a plan view of the flyweight vibrator, also partially in section.

As can be seen from FIGS. 1 and 2, each of the oscillating cranks 32 and 34 has a counterweight 62 and 64, respectively, on the side opposite the intermediate gear 54 and 56 respectively with respect to the axes 33 and 36, respectively, of the flyweight shaft 12 and 22, respectively. Due to the counterweights, each of the oscillating cranks 32 and 34 is mass balanced with respect to its swivelling axis, namely axes 33 and 36, respectively.

In the embodiment illustrated, the connecting rod 44 is coupled to the oscillating cranks 32 and 34, respectively, on the side opposite the intermediate gears 54 and 56, respectively, with respect to the axes 33 and 36, respectively, of the flyweight shafts 12 and 22, respectively.

The shifting mechanism 60 contains a toothed segment 66 fixed to the second oscillating crank 34 in the preferred embodiment illustrated. The toothed segment 66 is curved about the axis 36 of the associated flyweight shaft 22. A rack 68 is longitudinally movably guided in bushings 70,72 in the housing 10 and engages the toothed segment 66. The rack 68 is adjustable by means of motion transfer means, which are formed by a Bowden cable 74 in the preferred embodiment described.

A relatively light shifting mechanism with a Bowden cable 74 may be utilized for the shifting, as the oscillating cranks 32 and 34 are mass balanced and the oscillations described may be avoided thereby.

We claim:

1. A flyweight vibrator designed as a directional vibrator with the direction of oscillation being adjustable, comprising (a) a housing (10)

(b) A first flyweight shaft (12), which ($b_1$) is mounted in the housing (10), ($b_2$) carries a first flyweight (16), ($b_3$) is connected to a first gear (18) and ($b_4$) is adapted to be driven by a motor, (c) a second flyweight shaft (22), which ($c_1$) is mounted in the housing (10) parallel to the first flyweight shaft (12), ($c_2$) carries a second flyweight (28) and ($c_3$) is connected to a second gear (30), (d) a first oscillating crank (32) pivotably mounted about the axis (33) of the first flyweight shaft (12), (e) a second oscillating crank (34) mounted for pivoting about the axis (36) of the second flyweight shaft (22), (f) a connecting rod (44)

($f_1$) which is coupled to the first and the second oscillating crank (32,34) at equal distances from the axes (33,36) of the associated flyweight shafts (12,22) and ($f_2$) the effective length of which is equal to the distance of these axes (33,36) from each other, (g) a first intermediate gear (54), which ($g_1$) is mounted for rotation on the first oscillating crank (32) at a distance from the axis (33) of the first flyweight shaft (12) and ($g_2$) meshes with the first gear (18), (h) a second intermediate gear (56), which ($h_1$) is mounted for rotation on the second oscillating crank (34) at a distance from the axis (36) of the second flyweight shaft (22) equal to the distance of the first intermediate gear (54) from the axis (33) of the first flyweight shaft (12), ($h_2$) meshes with the second gear (30) and ($h_3$) meshes with the first intermediate gear (54) and (i) a shifting mechanism (60) arranged to rotate the two oscillating cranks characterized in that (j) each of the oscillating cranks has a counterweight on the side opposite the intermediate gear and is individually mass-balanced thereby with respect to its pivotal axis, such that oscillations of the vibrator, even if they do not fall into the longitudinal direction of the oscillating cranks, do not exert any torque upon the oscillating cranks about the axes of the flyweight shafts.

2. Flyweight vibrator as set forth in claim 1, characterized in that the connecting rod (44) is mounted on the oscillating cranks on the side opposite the intermediate gears (54,56) with respect to the axes (33,36) of the flyweight shafts (12,22).

3. Flyweight vibrator as set forth in claim 1 or 2, characterized in that the shifting mechanism (60)

(a) comprises a toothed segment (66)

($a_1$) attached to one of the oscillating cranks (34) and ($a_2$) curved about the axis (36) of the associated flyweight shaft (22), as well as (b) a rack (68), which ($b_1$) is longitudinally movably guided in the housing (10) and ($b_2$) engages the toothed segment (66) and (c) motion transfer means (74) by means of which the rack (68) is adjustable.

4. Flyweight vibrator as set forth in claim 3, characterized in that the motion transfer means (74) are formed by a Bowden cable.

* * * * *